United States Patent
Lailly et al.

(10) Patent No.: US 7,069,200 B2
(45) Date of Patent: Jun. 27, 2006

(54) METHOD INTENDED TO OBTAIN REFLECTION TRAVEL TIMES FROM AN INTERPRETATION OF MIGRATED CYLINDRICAL WAVE SEISMIC DATA

(75) Inventors: Patrick Lailly, Pau (FR); Frédéric Assouline, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 847 days.

(21) Appl. No.: 10/020,202

(22) Filed: Dec. 18, 2001

(65) Prior Publication Data

US 2002/0116160 A1    Aug. 22, 2002

(30) Foreign Application Priority Data

Dec. 18, 2000    (FR) .................................. 00 16471

(51) Int. Cl.
*G06G 7/48* (2006.01)
(52) U.S. Cl. .............................. 703/5; 702/18; 367/38
(58) Field of Classification Search ............ 703/5; 702/14, 17, 18; 367/21, 38, 57
See application file for complete search history.

(56) References Cited

U.S. PATENT DOCUMENTS

| 5,737,220 A * | 4/1998 | Miller ......................... 702/14 |
| 5,764,514 A | 6/1998 | Raynaud et al. ............ 384/420 |
| 5,852,588 A * | 12/1998 | de Hoop et al. .............. 367/38 |
| 5,991,695 A | 11/1999 | Wang et al. ................... 702/14 |
| 6,067,275 A * | 5/2000 | Sayers .......................... 367/75 |
| 6,418,379 B1 * | 7/2002 | Bloor et al. ................... 702/17 |
| 6,446,007 B1 * | 9/2002 | Finn et al. ..................... 702/14 |

OTHER PUBLICATIONS

Kennet, B.L.N., "Slowness Techniques in Seismic Interpretation", Meeting to Honor Sir Edward Crisp Bullard, La Jolla, CA, USA, Jan. 11–12, 1980, vol. 86, No. 812, pp. 11575–11584, XP001027864, Journal of Geophysical Research, Dec. 10, 1981, USA ISSN 0148-0227.

* cited by examiner

*Primary Examiner*—Albert W. Paladini
(74) *Attorney, Agent, or Firm*—Antonelli, Terry, Stout, and Kraus, LLP.

(57) ABSTRACT

A method intended to obtain reflection travel times from an interpretation of seismic data in migrated cylindrical waves, for a given value of the parameter defining the slope of these waves, or the superposition of such data associated with various substantially parallel acquisition lines, this parameter possibly taking successively several values. The method comprises the steps:

a) defining a slowness vector ($\vec{p}$)
b) for a given position of a seismic receiver of abscissa ($X_R$) on an acquisition line, seeking, the abscissa ($\xi$) of the source;
c) determining a travel time ($t^e(X_R)$)
d) repeating steps (b and c) for all the positions of the receivers for which demigration result is wanted; and
e) repeating steps (a to d) for all the acquisition lines for which a demigration result is wanted and for all the values taken by parameter ($p_x$).

14 Claims, 2 Drawing Sheets

METHOD INTENDED TO OBTAIN REFLECTION TRAVEL TIMES FROM AN INTERPRETATION OF MIGRATED CYLINDRICAL WAVE SEISMIC DATA

BACKGROUND OF THE INVENTION

1. Field of The Invention

The present invention relates to a method for obtaining reflection travel times from an interpretation of seismic data in migrated cylindrical waves, for a given value of a parameter defining the slope of these waves, or from the superposition of such data associated with various substantially parallel acquisition lines.

1. Description of the Prior Art

Demigration of seismic data is the inverse of migration, which is a conventional seismic data imaging method essentially consisting, knowing the value of a wavefield at a known depth, for example at the surface, as well as a distribution model of the propagation velocities of the waves in the subsoil, in modeling the propagation of the source field and the backpropagation of the reflection data recorded, and in seeking phase coherences between these two modeled fields. Migration is particularly useful for interpretation of seismic data acquired on complex structures.

It also allows to access, via demigration, the arrival times of the reflections associated with the picked events. This operation is notably carried out for determining, by means of kinematic methods such as migration velocity analysis methods, the velocity distribution in the subsurface. This determination constitutes a key stage in complex structures imaging. An example of such a method is described by: Stork, C., 1992; <<Reflection Tomography in the Postmigrated Domain>>; Geophysics, 57, 680–692.

A particularly effective migration velocity analysis method, referred to as Smart (<<Sequential Migration Aided Reflection Tomography>>) is notably described by: Ehinger, A. and Lailly, P., 1995, Velocity Model Determination by the SMART Method, Part 1: Theory: 65th Ann. Internat. Mtg., Soc. Expl. Geophys., Expanded Abstracts, pp. 739–742.

Reflection tomography is used, in such methods, for determining the velocity model. The reflection travel times (reflection tomography data) are obtained, in the complex parts, by demigrating the picked events upon interpretation of the migrated data. This method has been successfully implemented for 3D imaging of complex structures by using 2D prestack migration algorithms (and the associated demigration) on a set of seismic profiles extracted from a 3D acquisition. However, such an approach is efficient only in a very specific context:

- on the geologic plane, the structure must vary relatively slowly in a direction (referred to as <<strike>> in English literature);
- the seismic profiles must be acquired in the orthogonal direction (therefore the complexity direction) referred to as <<dip>> in the English literature.

On the other hand, this approach is difficult to use with complex structures without a privileged direction: such structures require prestack 3D migration techniques, which involve long calculation times, especially if imaging is carried out on a volume.

French Patent 2,784,195, filed by the assignee, notably describes another seismic data migration method known in the art as Alchemig. This method allows performing a 3D prestack migration of seismic events and imaging of the volumes of an underground zone, with an attractive calculation time, from a series of a number $N_s$ of reflection survey cycles.

It comprises successive emission of elementary wavefields, each defined by the association of a seismic signal $W(t)$ and of a determined emission point from a series of emission points $\vec{S}_i$ with $1 \leq i \leq N_S$, reception, by seismic receivers placed at positions $\vec{R}_i^j$, of the seismic signals reflected by the zone in response to each one of these wavefields, and recording of the various signals received by each seismic receiver in form of time-dependent seismic traces $d_i^j(t)$. For a given velocity model, a) a slowness vector $\vec{p}$ (homogeneous to the inverse of a velocity) whose two components $p_y$ and $p_x$ can take a previously defined series of values is defined, b) a time lag function $t_0(\vec{p},i)$ is defined for a given slowness vector $\vec{p}$ and for a given emission point $\vec{S}_i$, c) a time lag function $t_0(\vec{p},i)$ is applied to each elementary wavefield associated with emission point $\vec{S}_i$, and a composite wavefield is formed at the surface by spatiotemporal superposition of the various elementary wavefields to which such a time lag is applied, d) a time lag $t_0(\vec{p},i)$ is applied to each seismic trace $d_i^j(t)$ marked by pair (i,j) and a composite trace field is formed at the surface by spatiotemporal superposition of the various seismic traces to which such a time lag is applied, e) a migration of the composite trace field is carried out by using as the wavefield the composite wavefield, which is done by modeling the propagation of the composite wavefield and the backpropagation of the composite trace field, and by suitably combining the two composite fields thus modeled at any point of the zone to be imaged, F) steps (c to e) are repeated for all the values taken by components $p_y$ and $p_x$ of vector $\vec{p}$, and g) for any fixed value of the second component $p_x$ of the vector $\vec{p}$, the results of these various combinations are summed so as to obtain a migrated image associated with this fixed value of $p_x$, thus performing a prestack migration.

It is assumed that, even if the technique proves robust in case of violation of these hypotheses, the seismic data is constant-azimuth data (the azimuth being defined as the direction of the source-pickup bipoints) (hypothesis 1) and that acquisition is carried out by displacing the source along lines parallel to the direction defined by the azimuth (hypothesis 2).

If this is not the case, it can be remedied by first carrying out a preprocessing operation, for example according to the technique referred to as AMO (<<Azimuth Moveout>>), well-known to the man skilled in the art, to adjust the data obtained from standard marine acquisitions.

The co-ordinates system selected here is such that the x-axis is parallel to the direction of the acquisition lines and the y-axis thus represents the position of an acquisition line. Hereafter the measurement by cylindrical wave data is defined, along an acquisition line, of the seismic response of the subsurface to a cylindrical wave (wave generated by a source line and whose phase varies linearly with the abscissa along the acquisition line) whose axis coincides with the acquisition line considered. Considering this definition, the Aichemig technique allows obtaining the superposition, along the various acquisition lines, of migrated cylindrical wave data, these cylindrical waves being associated with an acquisition line and with a predetermined value of parameter $p_x$ defining the slope of the cylindrical wave. The procedure consists in applying to the data linear phase shifts parametered by vector $\vec{p}$ whose component along the profiles axis is $p_x$, and in calculating such a superposition by applying to the phase shifted data a plane-wave migration software. Postmigration stacking is obtained by summing the results obtained for the different values taken $p_x$. We suppose that, by suitable selection of the origin of the mark or of the phase shift function, the point of the surface where the phase shifts are zero has (x=0, y=0) as the co-ordinates.

It can be noted that the technique described above is one way among many to obtain superposition of migrated cylindrical wave data associated with parallel acquisition lines and with a given value of parameter $p_x$ Another procedure, can for example, is described by Claerbout, J. F., 1971, Towards a Unified Theory of Reflector Mapping; in Geophysics, 36, No. 3, 467–481, in calculating the result by carrying out, for each acquisition line:

propagation of the cylindrical wave and back propagation of the cylindrical wave data, and calculation, at any point of the space, of the cross correlation of the source field whose propagation has been modeled and of the back propagated data field, which allows obtaining, for the acquisition line considered, the migrated cylindrical wave data;

and by stacking (superposing) the migrated cylindrical wave data obtained for the various acquisition lines.

If, for several values of parameter $p_x$, the superposition of migrated cylindrical wave data is associated with various acquisition lines, it is possible, as explained in the aforementioned patent, to control the quality of the velocity model used for the migration and also to update the velocity model by exploiting the deformations of the events when going from one cylindrical wave parameter to the next (migration velocity analysis).

For updating, according to the aforementioned Smart method (or others), the events have to be picked, for various values of parameter $p_x$, in the superposition of the migrated cylindrical wave data, a superposition corresponding to the various acquisition lines, then the picked events have to be demigrated and the model is updated by reflection tomography. Even it is required to be known how to demigrate the interpreted migrated events when interpretation has been performed on migrated cylindrical wave data or the superposition obtained for various acquisition lines.

SUMMARY OF THE INVENTION

The method according to the invention allows determination of the reflection travel times of seismic events picked on 3D records of seismic data corresponding to signals picked up by seismic receivers distributed along an acquisition line (respectively along several acquisition lines) in response to the emission, in the subsoil, of waves from one or more source points, this data having been previously converted into migrated cylindrical wave data and interpreted (respectively in a superposition of migrated cylindrical wave data and interpreted).

In cases where interpretation has been carried out on the migrated data associated with a single cylindrical wave, and therefore a single acquisition line, the method comprises the following steps:

a) defining a slowness vector ($\vec{p}$) whose component ($p_x$) in a direction parallel to the acquisition line defines the slope of the cylindrical wave; b) for a seismic receiver situated at abscissa ($X_R$) on the acquisition line, seeking an abscissa ($\xi$) of the source point on the acquisition line such that a ray starting from the seismic receiver and reflecting on a picked event emerges at the source point, with a slowness vector ($\vec{p}$) whose component in the direction of the acquisition line is ($-p_x$);

c) determining a travel time ($t^e(X_R)$) by adding to the value of the travel time along the ray a time equal to the product of the slope of the cylindrical wave by the abscissa of the source point;

d) repeating steps (b and c) for all the positions of the receivers for which a demigration result is wanted; and e) repeating steps (a to d) for all the values taken by parameter ($p_x$) for which an event has been picked in the corresponding migrated data.

In cases where interpretation has been carried out on the superposition of cylindrical wave data, a superposition performed from several acquisition lines, the method comprises the following steps:

a) defining a slowness vector ($\vec{p}$) whose component ($p_x$) in a direction parallel to the acquisition lines defines the slope of the cylindrical waves associated with the various acquisition lines;

b) for a given seismic receiver situated at abscissa ($X_R$) on an acquisition line, seeking an abscissa ($\xi$) of a source point on the acquisition line such that a ray starting from the seismic receiver and reflecting on a picked event emerges at the source point, with a slowness vector ($\vec{p}$) whose component in the direction of the acquisition line is ($-p_x$);

c) determining a travel time ($t^e(X_R)$) by adding to the value of the travel time along the ray a time equal to the product of the slope of the cylindrical wave by the abscissa of the source point;

d) repeating steps (b and c) for all the positions of the receivers for which a demigration result is wanted;

e) repeating steps (a to d) for all the acquisition lines for which a demigration result is wanted; f) repeating steps (a to e) for all the values taken by parameter ($p_x$) for which an event has been picked in the corresponding migrated data.

The prior processing operation leading to migrated cylindrical wave data can possibly involve, if necessary, AMO type preprocessing as mentioned above or a spatial resampling of the seismic data acquired in the field.

According to an implementation mode, the travel times associated with the cylindrical wave events are used to implement a cylindrical-wave reflection tomography technique and to calculate a velocity distribution in the environment.

According to another implementation mode, the travel times associated with the cylindrical wave events are converted into travel times associated with the events by shotpoints, by exploiting the correspondences between the cylindrical wave data and the shotpoint data.

According to an implementation mode, when the seismic data acquisition device is organized by acquisition lines, i.e. when a series of source points and a series of pickups are arranged in one line, the synthesized shot travel times are converted to travel times associated with the source-receiver pairs (of the seismic data acquisition device), this conversion being obtained by extrapolation in the direction of the acquisition lines of the synthesized travel time for the source-receiver pair that is the closest to the source-receiver pair for which information on the travel time is wanted.

According to an implementation mode, the seismic data being only constant-azimuth data, the synthesized shot travel times are converted into travel times associated with the source-receiver pairs, this conversion being performed by means of a double extrapolation, one in the direction defined by the azimuth, the second in the direction orthogonal to the previous direction.

The method can be used notably to determine the velocity model by applying for example a reflection tomography to the travel times obtained.

BRIEF DESCRIPTION OF THE DRAWINGS

Other features and advantages of the method according to the invention will be clear from reading the description hereafter of non-limitative examples, with reference to the accompanying drawings wherein.

DETAILED DESCRIPTION OF THE PREFERRED EMBODIMENTS

Figure 1:
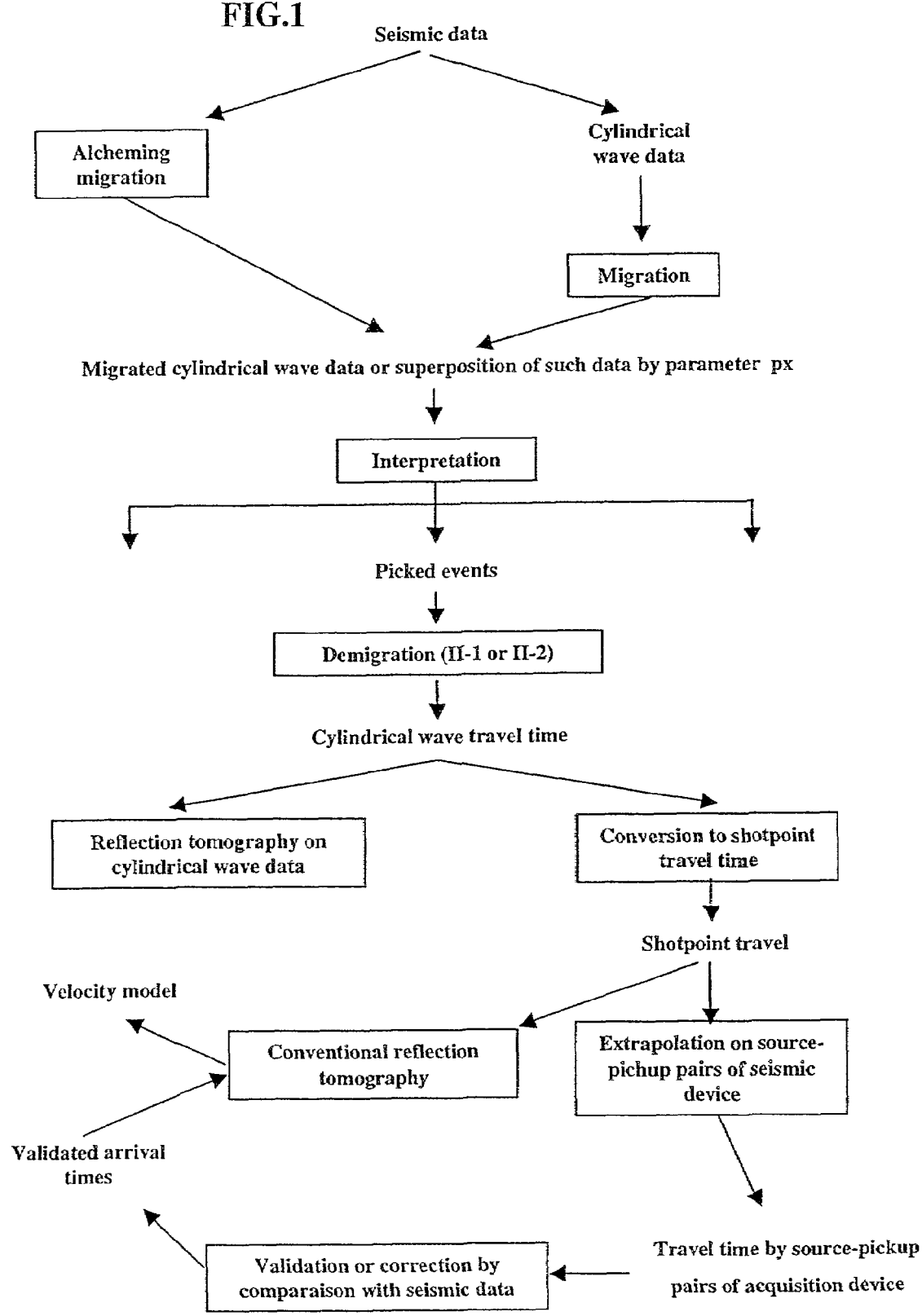
FIG. 1 describes the various options allowing implementation of the method according to the invention, and FIG. 2 compares, on a constant-offset record section, the seismic data with the arrival times obtained by implementing an option of the method.

Demigration of events picked on migrated cylindrical wave data requires a specific technique. Successively distinguished are:
  demigration of an event picked on migrated cylindrical wave data,
  demigration of the superposition (stack) of migrated cylindrical wave data, associated with various acquisition lines,
  obtaining kinematic data (reflection travel time) associated with source-pickup pairs, and
  obtaining kinematic data associated with source-pickup pairs existing in the original acquisition device (i.e. for the source-pickup pairs used for migration).

1) Demigration of an Event Picked on Migrated Cylindrical Wave Data

The result of such a demigration is the time of arrival, on the records associated with the cylindrical wave considered (characterized by the co-ordinate along the y-axis of the acquisition line and by the value of parameter $p_x$ defining the slope of the cylindrical wave), of the reflection corresponding to the picked event. This arrival time $t^e$ depends on the abscissa $X_R$ of the receiver considered. Demigration is naturally conducted by seeking, for a given receiver position, the abscissa $\xi$ of the source point or of the source points S on the line considered, such that the ray starting from the receiver and reflecting on the picked event emerges at S with a slowness vector $\vec{p}$ whose component along x is $-p_x$, the velocity model being identical to the model used for migration.

Thus worded, the problem appears to be the solution of a non-linear equation (expressing the condition on the slowness vector) in a single unknown (abscissa $\xi$ of the source). This equation can be solved numerically by means of any method suited for solution of non-linear equations, such as Newton's method for example.

The travel time resulting from the demigration $t^e(X_R)$ will be obtained by taking the value of the travel time along all the rays obtained for source S, a time to which quantity $p_{x\xi}$ is added. It can be noted that there is in fact an infinity of such rays, but these rays give, for a given arrival, the same travel time. This operation is repeated for all the receiver abscissas for which the demigration result is sought. The arrival times thus obtained constitute intrinsic information connected with the synthesized cylindrical wave data. They do not depend on the velocity model used for the migration (which justifies the fact that they can be used for determination of the velocity model), because the demigration operation described above is, as regards kinematics, the inverse of the migration of cylindrical wave data. Component $p_R$ along x of slowness vector $\vec{p}$ of the ray at the emergence of the seismic pickup also constitutes a quantity that is intrinsically linked with the data and which therefore does not depend on the velocity model used for the migration; it gives the slope, on the cylindrical wave data, of the event recorded by the pickup.

2) Demigration of the Superposition of Migrated Cylindrical Wave Data, Associated with Various Acquisition Lines This operation is simply carried out by repeating the operation defined in the previous paragraph for all the acquisition lines where a demigration result is desired and delivers the same intrinsic quantities, i.e. the time of arrival of the event, on the cylindrical wave data associated with each line, as a function of the abscissa of the pickup and of the slope of this event on the x-axis, i.e. component $p_R$ along x of the slowness vector when the ray emerges at the pickup. Furthermore, if the components on the y-axis of the slowness vector for rays emerging at the surface respectively at the pickup and at the source are denoted by $p_R^y$ and $p_S^y$ quantity $p_R^y + p_S^y$ also appears as an intrinsic quantity and is interpreted as the slope, on the y-axis (therefore from one line to the next), of the event seen for the seismic pickup abscissa considered, on cylindrical wave data associated with parameter $p_x$.

3) Obtaining Kinematic Data (Reflection Travel Time) Associated with Source-Pickup Pairs If reflection tomography software which processes travel times associated with cylindrical waves is available, the data obtained in the previous paragraph is sufficient for updating the velocity model and for migration velocity analysis according to the Smart method.

If such inversion softwares are not available, and if conventional softwares processing kinematic data organized by source-receiver pairs are used, the steps described hereafter will be carried out.

This step exploits correspondences between the cylindrical wave data and the shovpoint data, i.e. all the records obtained with the various receivers for the same seismic source assumed to be a point source.

Such a correspondence can be exploited only if cylindrical wave data associated with several values of parameter $p_x$ defining the slope of the cylindrical waves is available. It should be noted that migration has no role here: the point is simply to transform data. The kinematic data (reflection travel time) associated with source-pickup pairs is obtained by proceeding acquisition line by acquisition line (the source-pickup pairs are assumed to be situated on these lines).

For a given line, it is obtained by applying the techniques described In the previous two paragraphs, a function $t^e(X_R)$ for various values of parameter $p_x$. In other words, the function is obtained that is named after a notation change, $t^e(p_x, X_R)$, or more exactly for a sampling of this function, the values taken by this function are obtained for specific values of the $(p_x, X_R)$ pair. A function $X_S(P_x, X_R)$ is defined by the relation:

$$X_S(p_x, x_R) = \frac{\partial t^e}{\partial p_x}(p_x, x_R) \quad (1)$$

a quantity that can be evaluated numerically (for example by using approximations based on finite differences) for specific values of the $(p_x, X_R)$ pair. Formula (2) hereafter gives the time denoted by $t^e(X_S, X_R)$ of the event at the pickup of abscissa $X_R$ in the shotpoint data for a shot abscissa $X_S = X_S (p_x, X_R)$.

$$T^e(x_S, x_R) = t^e(p_x, x_R) - p_x X_S(p_x, x_R) \quad (2)$$

The times thus obtained are intrinsic quantities: they are only related to the seismic data and they do not depend on the way migration has been implemented. In conclusion, it is sufficient to apply formula (2) on the various lines for all the $(p_x, x_R)$ pairs for which data $t^e(p_x, x_R)$ and $$\frac{\partial t^e}{\partial p_x}(p_x, x_R)$$

is available to know the arrival times of the interpreted event (or, in practice, of each interpreted event) for a multitude of source-pickup pairs covering the surface and thus allow precise determination, via a reflection travel time tomography, of the velocity model.

4) Obtaining Kinematic Data Associated with Source-Pickup Pairs Existing in the Original Acquisition Device Even if the data obtained by means of the technique described in the previous section is sufficient to update the velocity model, it may be useful to compare the times obtained with the non-migrated original seismic data. Such a comparison is in fact interesting for validating the picking (and notably the interpretation) performed on the migrated data and for checking the reliability of the demigration which, as mentioned above, involves numerical procedures based on approximations and ray tracing, a very sensitive tool for numerical representation of the reflectors.

However, direct comparison is difficult since there is no reason for the source-pickup pairs to be those corresponding to the data used for the migration. In fact, the travel times provided by the method described in the previous section are obtained for source-pickup pairs distributed as a series of clusters distributed in 2D spaces (each one of these spaces corresponding to an acquisition line), whereas the original data can be distributed in form of a cluster distributed in a 3D space. However, even in cases where migration has been carried out from data organized by 3D lines, the problem remains the same: there is no reason for the source-pickup pair defined by the pair of abscissa $(X_S(p_x, X_R), X_R)$, obtained as explained in the previous section, to appear in the original acquisition device.

Interpolation or extrapolation techniques are necessary to obtain kinematic data associated with source-pickup pairs existing in the original acquisition device from the results obtained according to the method described in the previous section. One technique consists in defining a proximity criterion in a 2D or 3D space and, for a given source-receiver pair of the original acquisition device, in assigning thereto the travel time of the source-pickup pair that is the closest among those for which travel time information has been obtained by means of the method described in section Such an approach is viable if the information extrapolation distance is not too great. In the opposite case, more elaborate techniques have to be implemented, such as those described hereafter, according to whether resampled data or constant-azimuth data is used.

4-1 Implementation on Data Organized by Acquisition Lines

In this implementation type, it is assumed that the seismic data is constant-azimuth data and that acquisition is carried out by displacing the source along lines parallel to the direction defined by the azimuth, for example after spatial resampling of the data and/or AMO type preprocessing, as mentioned above. The source-pickup pairs involved in the implementation of the migration method are distributed as clusters distributed in 21) spaces, each one of these spaces corresponding to an acquisition line.

In this case, the data is organized by acquisition line and it is desired to obtain the time of arrival of the event reflected for the source-pickup pair of the original acquisition device (disp), defined by the acquisition line to which it belongs and by abscissas $x_s^{disp}$ and $x_R^{disp}$. As explained above, extracted from all the arrival times calculated for the line considered is the arrival time associated with the source-pickup pair defined by pair $(x_S^{calc}, X_R^{calc})$ that is the closest to the time associated with pair $(x_S^{disp}, x_R^{disp})$ among the cluster obtained in the 2D space described by pairs $(X_S, X_R)$. The formula (3) given hereafter is used to obtain the arrival time $t^e(x_S^{disp}, X_R^{disp})$ from the quantities obtained during the previous processing stages:

$$t^e(x_S^{disp}, x_R^{disp}) = t^e(x_S^{calc}, x_R^{calc}) - p_x(x_S^{disp} - x_S^{calc}) + p_R(x_R^{disp} - x_R^{calc}) \quad (3)$$

quantity $p_R$ having been defined in sections 1, 2 above. It can be noted that this formula exploits the following important result: according to hypotheses 1 and 2 stated in section 1, for a given pickup and therefore for a given acquisition line, the slope of an event in the cylindrical wave data associated with parameter $p_x$ is identical to the slope of the event in the shotpoint collection for the shot related by relation (1) to pair $(p_x, x_R)$ of abscissa $(x_R)$ of the pickup. The aforementioned extrapolation technique is of course not limitative. An interpolation technique can be used just as well.

4-2 Implementation of the Method on Constant-Azimuth Data

In this implementation type, it is assumed that the seismic data is constant-azimuth data. The source-pickup pairs involved in the implementation of the migration are distributed as clusters distributed in a 3D space, and these pairs can be described by means of three parameters the respective abscissas of the source and of the pickup, and their common ordinate. The problem is in obtaining the arrival times of the event reflected for the source-pickup pairs of the original acquisition device (therefore distributed as clusters in a 3D space) from the calculated times, by using the method presented in section 3. This method is then implemented for a series of fictitious acquisition lines of ordinate $y_i$, i representing the number of the line considered. These lines have to be sufficiently close to one another to allow extrapolation, on the source-pickup pairs of the original acquisition travel times calculated according to the method described in section 3. It is desired to calculate the travel time of the reflected event for a source-pickup pair of the original device, this pair having ($x_S^{disp}$, $x_R^{disp}$) as the abscissa and $y^{disp}$ as the common ordinate.

From all the arrival times calculated for the series of lines mentioned above, the time associated with the source-pickup pair defined by pair ($x_S^{calc}$, $x_R^{calc}$) and by ordinate $y_i$ that is the closest is extracted according to the metric defined in the 3D space, to the time associated with the source-pickup pair considered of the original device. The formula (4) hereafter is used to obtain the arrival time $t^e(X_S^{disp}, x_R^{disp}, y^{disp})$ from the quantities obtained during the previous processing stages:

$$t^e(x_S^{disp}, x_R^{disp}, y^{disp}) = t^e(x_S^{calc}, x_R^{calc}, y_i) - p_x(x_S^{disp} - x_S^{calc}) + p_R(x_R^{disp} - x_R^{calc}) + (p_R^y + p_S^y)(y^{disp} - y_i)$$

Here again, the extrapolation technique is given by way of non limitative example. An interpolation technique can be used just as well.

Figure 2:
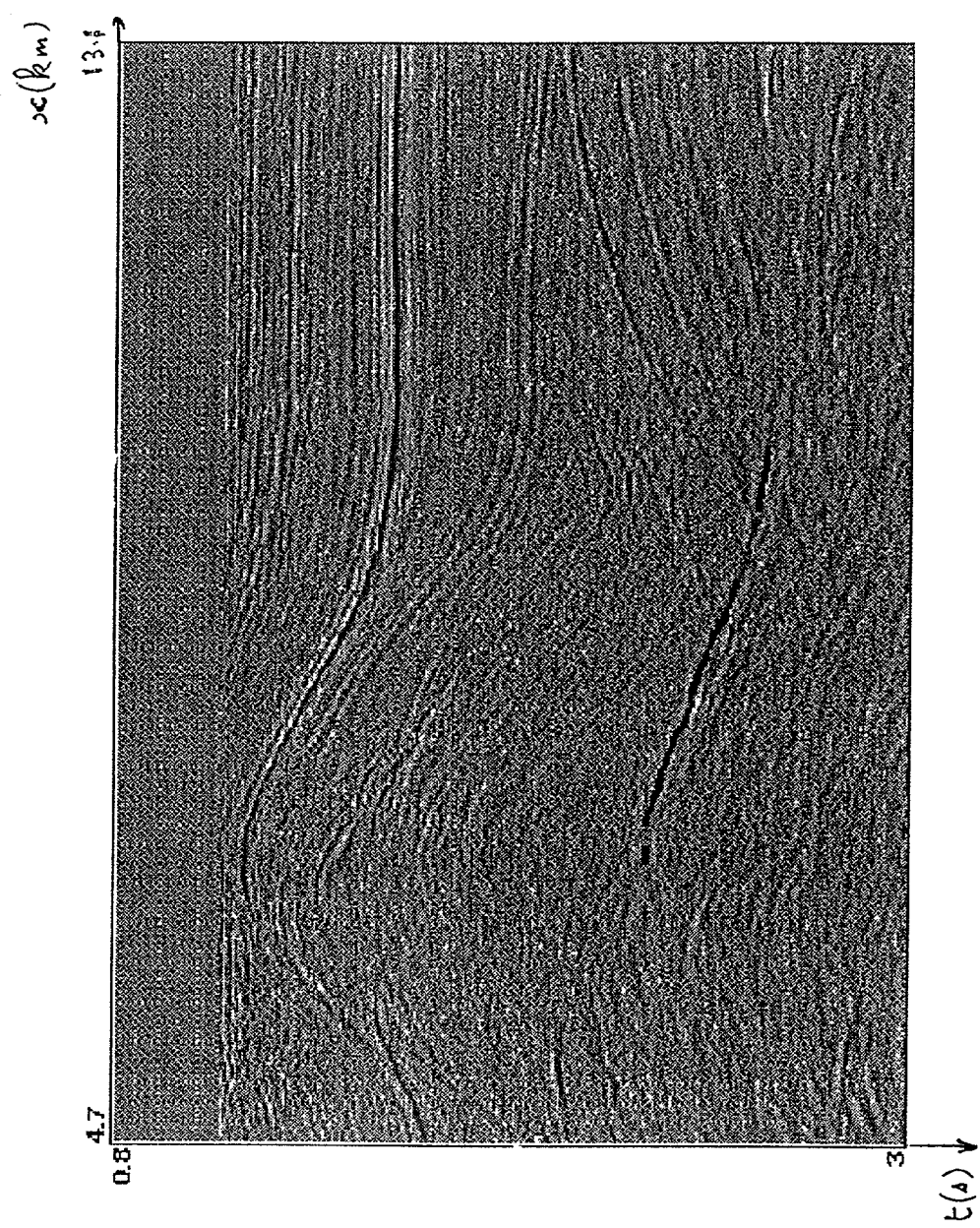

FIG. 2 compares, on a constant-offset section (1500 m here) obtained after 3D seismic prospecting operations in the North Sea, the seismic data with the arrival times obtained by implementing the technique described above. The reflection can be clearly seen at the base of the salt structure.

The invention claimed is:

1. A method for determining reflection travel times of seismic events picked on 3D records of seismic data corresponding to signals picked up by seismic receivers distributed along an acquisition line in response to an emission in a subsoil of waves from source points, the seismic data having been previously converted to cylindrical wave data and interpreted, comprising:

a) defining a slowness vector ($\vec{p}$) whose component ($p_x$) in a direction parallel to the acquisition line defines a slope of the cylindrical wave;

b) for a seismic receiver situated at abscissa ($X_R$) on the acquisition line, seeking an abscissa ($\xi$) of at least one source point on the acquisition line such that rays starting from the seismic receiver at abscissa ($X_R$) and reflecting on a picked event emerges at the said at least one source point, with the slowness vector ($\vec{p}$) whose component in a direction of the acquisition line is ($-p_x$);

c) determining a travel time ($t^e(X_R)$) for the said at least one source point by adding to a value of travel time along one of the said rays a time equal to a product of the slope of the cylindrical wave by the abscissa of the said at least one source point;

d) repeating steps b) and c) for all positions of the seismic receivers for which a demigration result is wanted; and e) repeating steps a) to d) for all the values taken by parameter ($p_x$) for which an event has been picked in corresponding migrated data.

2. A method for determining reflection travel times of seismic events picked on 3D records of seismic data corresponding to signals picked up by seismic receivers distributed along acquisition lines in response to an emission in a subsoil of waves from at least one source point, the data having been previously converted to a superposition of migrated cylindrical wave data and interpreted, comprising:

a) defining a slowness vector ($\vec{p}$) whose component ($p_x$) in a direction parallel to the acquisition lines defines a slope of the cylindrical waves associated with the various acquisition lines;

b) for a given seismic receiver situated at an abscissa ($X_R$) on an acquisition line, seeking an abscissa ($\xi$) of at least one source point on the acquisition line such that a ray starting from the seismic receiver and reflecting on a picked event emerges at said at least one source point, with the slowness vector ($\vec{p}$) whose component in the direction of the acquisition line is ($-p_x$);

c) determining a travel time ($t^e(X_R)$) for the said at least one source point by adding to a value of travel time along said ray a time equal to a product of the slope of the cylindrical wave by an abscissa of the said at least one source point;

d) repeating steps b) and c) for all the positions of the receivers for which a demigration result is wanted; and e) repeating steps a) to d) for all the acquisition lines for which a demigration result is wanted; and f) repeating steps a) to e) for all the values taken by parameter ($P_x$) for which an event has been picked in the corresponding migrated data.

3. A method as claimed in claim 1 where the travel times associated with the cylindrical wave events are used to implement a cylindrical wave reflection tomography technique and to calculate a velocity distribution in the environment.

4. A method as claimed in claim 2 where the travel times associated with the cylindrical wave events are used to implement a cylindrical wave reflection tomography technique and to calculate a velocity distribution in the environment.

5. A method as claimed in claim 1, where the travel times associated with the cylindrical wave events are converted to travel times associated with shotpoint events, by exploiting correspondences between the cylindrical wave data and shotpoint data.

6. A method as claimed in claim 2, where the travel times associated with the cylindrical wave events are converted to travel times associated with shotpoint events, by exploiting correspondences between the cylindrical wave data and shotpoint data.

7. A method as claimed in claim 5, where the seismic data is organized by acquisition lines, shot travel times are converted to travel times associated with source-receiver pairs, conversion of travel time being carried out by extrapolation, in a direction of the acquisition lines, of travel time for the source-receiver pair that is closest to the source-receiver pair of an acquisition device for which information on the travel time is wanted.

8. A method as claimed in claim 6, where the seismic data is organized by acquisition lines, shot travel times are converted to travel times associated with source-receiver pairs, conversion of travel time being carried out by extrapolation, in a direction of the acquisition lines, of travel time for the source-receiver pair that is closest to the source-receiver pair of an acquisition device for which information on the travel time is wanted.

9. A method as claimed in claim 5, where the seismic data are constant-azimuth data, the shot travel times are converted to travel times associated with the source-receiver pairs, conversion of travel time being carried out by means of a double extrapolation, the first extrapolation being in the direction defined by an azimuth, the second extrapolation being in direction orthogonal to the direction defined by the azimuth.

10. Application of the method as claimed in claim 5 for determining a velocity model by applying a reflection tomography to the travel times.

11. Application of the method as claimed in claim 6 for determining a velocity model by applying a reflection tomography to the travel times.

12. Application of the method as claimed in claim 7 for determining a velocity model by applying a reflection tomography to the travel times.

13. Application of the method as claimed in claim 8 for determining a velocity model by applying a reflection tomography to the travel times.

14. Application of the method as claimed in claim 9 for determining a velocity model by applying a reflection tomography to the travel times.

* * * * *